United States Patent
Zhu et al.

(10) Patent No.: US 9,516,675 B2
(45) Date of Patent: Dec. 6, 2016

(54) METHOD FOR ACCESSING WIRELESS LOCAL AREA NETWORK, ACCESS POINT AND WIRELESS LOCAL AREA NETWORK SYSTEM

(71) Applicant: Huawei Technologies Co., Ltd., Shenzhen (CN)

(72) Inventors: Junjun Zhu, Suzhou (CN); Ruiqiang Diao, Shanghai (CN); Huanteng Wang, Suzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 199 days.

(21) Appl. No.: 14/186,906

(22) Filed: Feb. 21, 2014

(65) Prior Publication Data

US 2014/0241268 A1    Aug. 28, 2014

(30) Foreign Application Priority Data

Feb. 25, 2013  (CN) .......................... 2013 1 0058996

(51) Int. Cl.
*H04W 4/00* (2009.01)
*H04W 74/04* (2009.01)
*H04W 74/08* (2009.01)
*H04W 84/12* (2009.01)

(52) U.S. Cl.
CPC ......... *H04W 74/04* (2013.01); *H04W 74/0816* (2013.01); *H04W 84/12* (2013.01)

(58) Field of Classification Search
CPC ....... H04W 72/04; H04W 88/08; H04W 76/00
See application file for complete search history.

(56) References Cited

U.S. PATENT DOCUMENTS

| 6,990,116 B1* | 1/2006 | Young | H04W 99/00 370/338 |
|---|---|---|---|
| 2006/0187952 A1* | 8/2006 | Kappes | H04W 74/0875 370/445 |
| 2006/0209771 A1* | 9/2006 | Shpak | H04W 74/0816 370/338 |
| 2008/0144500 A1* | 6/2008 | Chen | H04W 74/0816 370/235 |
| 2008/0181130 A1* | 7/2008 | Balu | H04W 8/005 370/254 |

(Continued)

OTHER PUBLICATIONS

IEEE Standard for Information technology—Telecommunications and information exchange between systems Local and metropolitan area networks—Specific requirements, Part 11: Wireless LAN Medium Access Control (MAC) and Physical Layer (PHY) Specifications, IEEE comuter Society, IEEE Std 802.11-2012, Mar. 29, 2012, 2793 pages.

*Primary Examiner* — Hassan Phillips
*Assistant Examiner* — Siren Wei
(74) *Attorney, Agent, or Firm* — Slater Matsil, LLP

(57) ABSTRACT

This application discloses a method for accessing a wireless local area network, an access point and a wireless local area network system. The access point obtains an uplink access collision value and broadcasts a first clear to send signal to all the stations associated with the access point when it is determined that the uplink access collision value exceeds a preset threshold. The first clear to send signal includes a media access control address of a first station associated with the access point. Data sent by the first station is received.

14 Claims, 3 Drawing Sheets

(56) References Cited

U.S. PATENT DOCUMENTS

2008/0285514 A1* 11/2008 Uchida ................. H04L 47/10
                                                    370/329
2010/0014452 A1    1/2010 Ueba et al.
2013/0044615 A1*  2/2013 Carrera ............ H04W 72/1242
                                                    370/252

* cited by examiner

METHOD FOR ACCESSING WIRELESS LOCAL AREA NETWORK, ACCESS POINT AND WIRELESS LOCAL AREA NETWORK SYSTEM

CROSS-REFERENCE TO RELATED APPLICATION

This application claims priority to Chinese Patent Application No. 201310058996.7, filed on Feb. 25, 2013, which is hereby incorporated by reference in its entirety.

TECHNICAL FIELD

This application relates to the field of communications technologies, and in particular, to a method for accessing a wireless local area network (WLAN), an access point (AP) and a wireless local area network system.

BACKGROUND

Generally, a wireless local area network system includes an access point and a station (STA). Wireless data transmission may be performed between the access point and the station, so as to form a wireless network. The access point is equivalent to a bridge connecting a wired network and a wireless network. The access point connects various stations together, and then connects the wireless network to an Ethernet, so as to implement communication between the stations and the wired network.

In the prior art, data between the access point and the station is transmitted via a wireless medium, and access to the wireless medium is generally controlled through a coordination function, which includes two types: a distributed coordination function (DCF) and a point coordination function (PCF). The point coordination function is a noncompetitive mechanism, that is, an access point polls stations, so as to control access of the stations; therefore, a collision does not occur between stations under the PCF mechanism. However, currently there are few products supporting the PCF mechanism, so that a WLAN can hardly support the PCF mechanism. For most transmission operations in the WLAN, a distributed coordination function mechanism is adopted.

The DCF is a competitive mechanism. Before attempting to send data to an access point, a station detects whether the access point is in an idle state. If the access point is in the idle state, the station sends the data to the access point. If the access point is in a busy state, the station needs to delay its access, and uses an exponential backoff algorithm to randomly allocate a random backoff time value within the range of a contention window. When the delay reaches the backoff time value, the station competes again to access the access point. However, the inventor of this application finds out in long term researches that, because the waiting time of each station is a randomly allocated value, the station may collide again with other stations when accessing the access point again. The value of collision recurrence is related to the number of stations waiting for access. Generally, the more the stations wait for access, the more easily the collision occurs again. Therefore, when too many users concurrently access an access point in a WLAN, a significant access collision may exist, which may lead to a tremendous drop of uplink throughput of the WLAN.

SUMMARY

This application provides a method for accessing a wireless local area network, an access point and a wireless local area network system, which are capable of improving uplink throughput of the wireless local area network when too many stations concurrently access and cause a collision.

To solve the foregoing technical problem, in a first aspect, this application provides a method for accessing a wireless local area network, including: obtaining, by an access point, an uplink access collision value where the uplink access collision is due to that multiple stations associated with the access point simultaneously send data to the access point; and broadcasting, by the access point, a first clear to send signal to all the stations associated with the access point when it is determined that the uplink access collision value exceeds a preset threshold, where the first clear to send signal includes a media access control (MAC) address of a first station associated with the access point, so as to instruct the first station to send data to the access point.

With reference to the first aspect, in a first possible implementation manner of the first aspect, the first clear to send signal further includes usage duration, so as to instruct the first station to send data to the access point within the usage duration.

With reference to the first aspect or the first possible implementation manner of the first aspect, in a second possible implementation manner of the first aspect, the step of obtaining an uplink access collision value specifically includes: obtaining the uplink access collision value according to maximum uplink throughput, a retransmission rate, the number of stations waiting to send data, and idle usage.

With reference to the first aspect and any one of the first possible implementation manner and the second possible implementation manner of the first aspect, in a third possible implementation manner of the first aspect, the method further includes: monitoring, within a preset waiting time, whether the access point receives the data sent by the first station; obtaining again an uplink access collision value if the access point receives within the preset waiting time the data sent by the first station; and broadcasting a second clear to send signal to all the stations associated with the access point if the access point does not receive within the preset waiting time the data sent by the first station, where the second clear to send signal includes a media access control address of a second station associated with the access point, so as to instruct the second station to send data to the access point.

With reference to the first aspect and any one of the first possible implementation manner to the third possible implementation manner of the first aspect, in a fourth possible implementation manner of the first aspect, before the step of broadcasting, by the access point, a first clear to send signal to all the stations associated with the access point when it is determined that the uplink access collision value exceeds a preset threshold, the method further includes: determining that the access point does not support a point coordination function.

To solve the foregoing technical problem, in a second aspect, this application provides an access point, including: an obtaining module and a sending module; the obtaining module is configured to obtain an uplink access collision value, where the uplink access collision is due to that multiple stations associated with the access point simultaneously send data to the access point; and the sending module is configured to broadcast a first clear to send signal to all the stations associated with the access point when it is determined that the uplink access collision value exceeds a preset threshold, where the first clear to send signal includes a media access control address of a first station associated with the access point, so as to instruct the first station to send data to the access point.

With reference to the second aspect, in a first possible implementation manner of the second aspect, the first clear to send signal further includes usage duration, so as to instruct the first station to send data to the access point within the usage duration.

With reference to the second aspect or the first possible implementation manner of the second aspect, in a second possible implementation manner of the second aspect, the obtaining module is specifically configured to obtain the uplink access collision value according to maximum uplink throughput, a retransmission rate, the number of stations waiting to send data, and idle usage.

With reference to the second aspect and any one of the first possible implementation manner and the second possible implementation manner of the first aspect, in a third possible implementation manner of the second aspect, the access point further includes a monitoring module, where the monitoring module is configured to monitor, within a preset waiting time, whether the access point receives the data sent by the first station; the obtaining module is further configured to obtain again an uplink access collision value when the access point receives within the preset waiting time the data sent by the first station; and the sending module is further configured to broadcast a second clear to send signal to all the stations associated with the access point when the access point does not receive within the preset waiting time the data sent by the first station, where the second clear to send signal includes a media access control address of a second station associated with the access point, so as to instruct the second station to send data to the access point.

To solve the foregoing technical problem, in a third aspect, this application provides a wireless local area network system, including an access point and multiple stations, where the multiple stations are associated with the access point and access the access point; the access point is configured to obtain an uplink access collision value, where the uplink access collision is due to that the multiple stations associated with the access point simultaneously send data to the access point, and is configured to broadcast a first clear to send signal to the multiple stations when it is determined that the uplink access collision value exceeds a preset threshold, where the first clear to send signal includes a media access control address of a first station associated with the access point, so as to instruct the first station to send data to the access point; and the multiple stations are configured to receive the first clear to send signal sent in a broadcast manner by the access point, and each station in the multiple stations determines whether the media access control address in the first clear to send signal is a media access control address of the station.

In the foregoing solutions of this application, when it is determined that a collision value exceeds a preset threshold, an access point automatically and cyclically broadcasts a clear to send signal, so as to prompt the station identified by the media access control address in the clear to send signal to send data to the access point, thereby avoiding a competitive mechanism when a significant uplink access collision exists in a WLAN. In this way, a collision between stations is avoided, and the uplink throughput of the WLAN is improved.

DESCRIPTION OF EMBODIMENTS

The following describes the technical solutions in the embodiments of the present invention with reference to the accompanying drawings and specific implementation manners.

Figure 1:
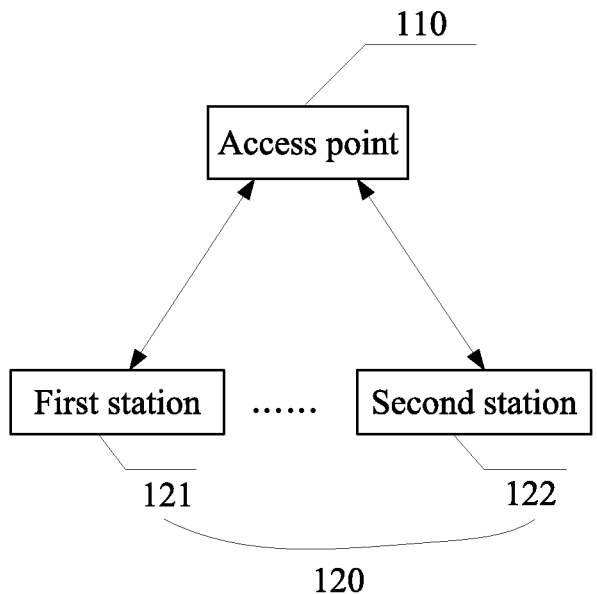
FIG. 1 is a schematic structural diagram of a wireless local area network system provided in an embodiment of the present invention.

FIG. 1 is a schematic structural diagram of a wireless local area network WLAN system according to an embodiment of the present invention. Referring to FIG. 1, in this implementation manner, the WLAN includes an access point 110 and multiple stations 120, where the multiple stations 120 at least include a first station 121 and a second station 122, and the multiple stations 120 are associated with the access point 110 and access the access point 110.

Generally, sending data from a station 120 to the access point 110 is called uplink communication, and sending data from the access point 110 to a station 120 is called downlink communication. When at least two stations 120 simultaneously send data to one access point 110, each time the access point 110 is capable of receiving data from only one station 120, and the other stations 120 needing to send data are in a waiting-to-send state. When a large number of stations 120 are in the waiting-to-send state, an uplink access collision occurs easily.

In this implementation manner, the access point 110 broadcasts a first clear to send (clear to send, CTS for short) signal when the uplink access collision value of the access point 110 exceeds a preset threshold, where the first CTS signal includes a MAC address of the first station 121 associated with the access point 110. The multiple stations 120 may receive the first CTS signal, and each station 120 may determine whether the MAC address in the first CTS signal is a MAC address of the station 120; when the MAC address of the first station 121 is consistent with the MAC address in the first CTS signal, it indicates that the access point 110 allows the first station 121 to work, and if the first station 121 needs to send data at this moment, the first station 121 sends the data to the access point 110. The other stations 120 receiving the first CTS signal keep silent because the MAC addresses thereof are inconsistent with the MAC address in the first CTS signal. The access point 110 receives the data sent by the first station 121, so as to complete uplink data access from the first station 121.

Then, the access point 110 obtains again an uplink access collision value, and determines whether the uplink access collision value exceeds the preset threshold; if the access point 110 determines that the uplink access collision value still exceeds the preset threshold, the access point 110 broadcasts a second CTS signal, where the second CTS signal includes a MAC address of the second station 122, so as to instruct the second station 122 to work, that is, instruct the second station 122 to send data to the access point 110. After that, the access point 110 determines again whether the uplink access collision value exceeds the preset threshold, and broadcasts a CTS signal when the uplink access collision value exceeds the preset threshold, so as to instruct another station 120 to send data to the access point 110; the rest can be deduced in the same manner until the access point 110 determines that the uplink access collision value does not exceed the preset threshold. At that time, the access point 110 stops broadcasting a CTS signal and restores normal operations. In this way, the multiple stations 120 may transmit data in an orderly manner according to the CTS signals of the access point 110, which prevents a collision from occurring and improves the uplink throughput of the WLAN.

It may be understood that, in other applicable implementation manners, the WLAN may include multiple access points, and each access point is associated with multiple stations and accessed by the multiple stations. When the uplink access collision value of any access point exceeds a preset threshold, the processing procedure and the processing principles are the same as those mentioned in the foregoing description. The embodiment of the present invention only takes one access point in the WLAN and multiple stations that are associated with the access point and access the access point as an example, to describe the processing procedure and the processing principles for the uplink access collision provided in the present invention.

Figure 2:
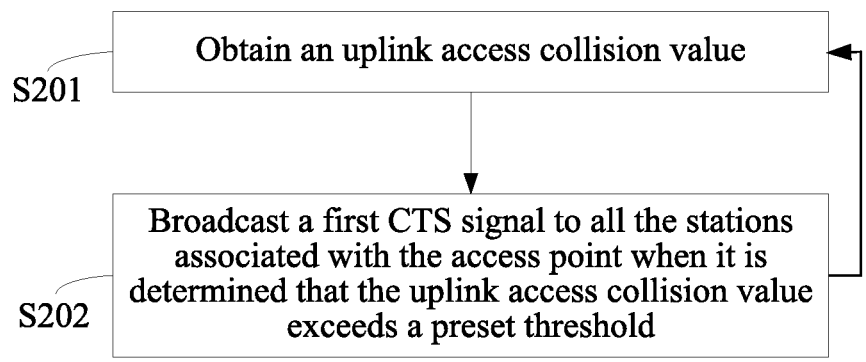
FIG. 2 is a flow chart of a method for accessing a wireless local area network provided in an embodiment of the present invention.

FIG. 2 is a flow chart of a method for accessing a WLAN according to an embodiment of the present invention. Referring to FIG. 2, the method includes the following steps:

Step S201: An access point obtains an uplink access collision value.

The uplink access collision is due to that multiple stations associated with the access point simultaneously send data to the access point. In a WLAN, when multiple stations simultaneously send data to an access point, an uplink access collision may occur. The access point may obtain the uplink access collision value according to maximum uplink throughput, a retransmission rate, the number of stations waiting to send data, idle usage, and the like.

Step S202: When determining that the uplink access collision value exceeds a preset threshold, the access point broadcasts a first CTS signal to all the stations associated with the access point, so as to instruct a first station to send data to the access point.

The first CTS signal includes a MAC address of the first station associated with the access point. The access point determines whether the uplink access collision value exceeds the preset threshold after obtaining the uplink access collision value. When the access point determines that the uplink access collision value exceeds the preset threshold, it indicates that currently there is a large amount of data in the WLAN waiting for uplink transmission. To avoid entering a competitive mechanism, the access point broadcasts the first CTS signal, so as to instruct the first station to send data to the access point.

The preset threshold is a collision value preset and saved in the access point. Certainly, in practical application, the preset threshold may either be constant, or be adjusted according to a user requirement on uplink throughput of the WLAN. For example, if the user does not require high uplink throughput of the WLAN, that is, a large number of collisions are allowed to exist in the WLAN, the threshold may be set to a larger value; and if the user requires high uplink throughput of the WLAN, the threshold is set to a smaller value.

After the first CTS signal is broadcast, the stations associated with the access point may receive the first CTS signal, and each station may determine whether the MAC address in the first CTS signal is a MAC address of the station. When the first station determines that the MAC address of the station is consistent with the MAC address in the first CTS signal, the first station sends data to the access point if there is data to be sent at this moment. The other stations receiving the first CTS signal keep silent because the MAC addresses thereof are inconsistent with the MAC address in the first CTS signal. The access point receives the data sent by the first station, so as to complete uplink data access from the first station.

When finishing receiving the data from the first station, the access point continues to execute step S201. If it is determined that the uplink access collision value still exceeds the preset threshold, a CTS signal carrying a MAC address of a station other than the first station, such as a second station, is broadcast to all the associated stations.

In the embodiment of the present invention, an access point allocates resources by broadcasting a CTS signal, which enables stations to perform uplink access to the access point in an orderly manner, thereby avoiding occurrence of an uplink access collision.

Figure 3:
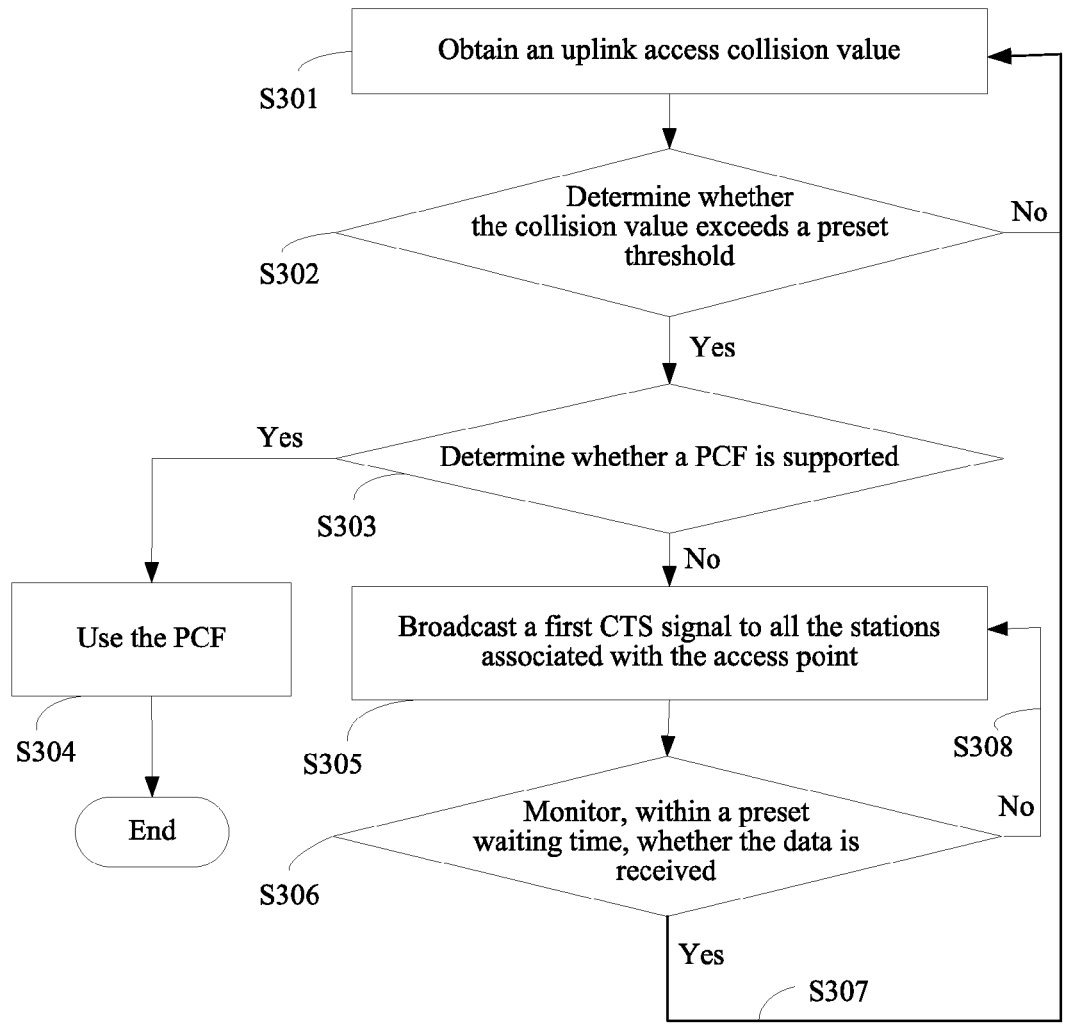
FIG. 3 is another flow chart of a method for accessing a wireless local area network provided in an embodiment of the present invention.

FIG. 3 is another flow chart of a method for accessing a WLAN according to an embodiment of the present invention. Referring to FIG. 3, the method includes the following steps:

Step S301: An access point obtains an uplink access collision value.

The uplink access collision is due to that multiple stations associated with the access point simultaneously send data to the access point. In a WLAN, when multiple stations simultaneously send data to an access point, an uplink access collision may occur. Specifically, the access point may obtain data of the WLAN, such as maximum uplink throughput, a retransmission rate, the current number of stations waiting to send data, and idle usage, and obtain the uplink access collision value of the WLAN according to the obtained data and a preset algorithm, where the obtained data includes the maximum uplink throughput, the retransmission rate, the current number of stations waiting to send data, and the idle usage. The retransmission rate is a value that stations in the WLAN retransmit data following a previous data transmission failure or delay retransmission because the access point is in a busy state; and the idle usage is the percentage of the duration for which the access point in the WLAN is in the idle state against the total time. According to the preset algorithm provided in this implementation manner, the maximum uplink throughput and the idle usage are inversely proportional to a collision condition, and the retransmission rate and the number of stations waiting to send data are directly proportional to the collision condition. That is, the smaller the maximum uplink throughput and the idle usage are, and the larger the retransmission rate and the number of stations waiting to send data are, the severer a collision in the WLAN is. Certainly, the present invention is not limited to obtaining the uplink access collision value according to the maximum uplink throughput, the retransmission rate, the current number of stations waiting to send data, the idle usage, and the like. In other implementation manners, the access point may further obtain the uplink access collision value according to other data of the WLAN related to the uplink access collision, which is not limited herein.

Step S302: The access point determines whether the uplink access collision value exceeds a preset threshold.

The access point determines whether the uplink access collision value exceeds the preset threshold. If the uplink access collision value exceeds the preset threshold, the access point goes to step S303; and if the uplink access collision value does not exceed the preset threshold, the access point works normally, and returns to step S301. In this implementation manner, when working normally, the access point may periodically obtain and determine the uplink access collision value of the WLAN, and broadcast a CTS signal when determining that the uplink access collision value exceeds the preset threshold, so as to ensure that the access point can avoid occurrence of the uplink access collision by broadcasting a CTS signal when the uplink access collision may occur.

Step S303: The access point determines whether a PCF is supported.

If the access point determines that the collision value exceeds the preset threshold, it is determined whether the access point supports the PCF. If support, the access point executes step S304; and if not support, the access point executes step S305.

Step S304: The access point uses the PCF, and the process ends.

If the access point supports the PCF, the PCF is used and the process ends. In this case, the access point queries the stations associated with the access point according to a polling list, so as to enable the polled stations to send data to the access point, which avoids occurrence of a collision.

It should be noted that, steps S303 and S304 are optional steps. In other implementation manners, when determining that the uplink access collision value exceeds the preset threshold, the access point may not need to determine whether the PCF is supported, that is, no matter whether the access point supports the PCF, step S305 is executed, which is not limited in the present invention.

Step S305: The access point broadcasts a first CTS signal to all the stations associated with the access point, so as to instruct a first station to send data to the access point.

The first CTS signal includes a MAC address of the first station associated with the access point. Preferably, when the access point determines that the uplink access collision value exceeds the preset threshold and does not support the PCF, to avoid entering a competitive mechanism, the access point automatically broadcasts the first CTS signal, where the first CTS signal includes the MAC address of the first station associated with the access point. Optionally, the first CTS signal further includes usage duration, where the usage duration is used to instruct the first station to send data to the access point within the usage duration, so as to prevent the first station from occupying access resources of the access point for a long time probably due to a large amount of data to be sent and prevent other stations from waiting an excessively long time.

Step S306: The access point monitors, within a preset waiting time, whether the data sent by the first station is received.

After broadcasting the first CTS signal, the access point monitors, within the preset waiting time, whether the data sent by the first station is received. If the data is received, the access point goes to step S307; and if the data is not received, the access point goes to step S308.

Step S307: If the access point receives within the preset waiting time the data sent by the first station, the access point returns to step S301, and repeats the foregoing process.

After broadcasting the first CTS signal, the access point waits for the first station to send data to the access point. If the access point receives within the preset waiting time the data sent by the first station, the access point returns to step S301 to obtain again an uplink access collision value, and repeats the foregoing process. Specifically, after the access point broadcasts the first CTS signal, the stations associated with the access point may receive the first CTS signal, and each station may determine whether the MAC address in the first CTS signal is a MAC address of the station. When the MAC address of the first station is consistent with the MAC address in the first CTS signal, it indicates that the access point allows the first station to work. If the first station needs to send data at this moment, the first station sends the data to the access point.

Further, optionally, when the first CTS signal includes usage duration, the access point receives within the usage duration the data sent by the first station; and if the first station still needs to send data when the usage duration is expired, the access point does not receive the data sent by the first station, and in this case, the access point returns to step S301 and repeats the foregoing process.

Step S308: If the access point does not receive within the preset waiting time the data sent by the first station, the access point returns to step S305 to broadcast a second CTS signal to all the stations associated with the access point, where the second CTS signal includes a MAC address of the second station associated with the access point, so as to instruct the second station to send data to the access point.

If the access point does not receive within the preset waiting time the data sent by the first station, it is possible that the first station has no data to be sent to the access point at this moment. In this case, the access point returns to step S305 to broadcast a second CTS signal to all the stations associated with the access point. The second CTS signal includes the MAC address of the second station associated with the access point, so as to instruct the second station to send data to the access point. Optionally, the second CTS signal further includes usage duration, so as to instruct the second station to send data to the access point within the usage duration.

Optionally, considering that there is delay in data transmission, the preset waiting time in this implementation manner may be set to a time value larger than short interframe space (SIFS), to prevent the access point from making a decision before a station sends data. The SIFS is interframe space for sending a frame to each other between the access point and a station.

Further, optionally, the access point may further adjust transmit power to control the size of coverage area, thereby controlling the number of the stations associated with and accessing the access point, so as to ensure network quality. For example, when the access point determines that an uplink access collision exists now, the transmit power of the access point may be lowered, and the coverage area of the access point may be narrowed down, so as to reduce the stations associated with and accessing the access point; in this way, uplink access data to the access point may also be reduced, which reduces collisions and improves uplink throughput.

In this implementation manner, an access point allocates resources by broadcasting a CTS signal, which enables stations to perform uplink access to the access point in an orderly manner, thereby avoiding occurrence of an uplink access collision. Moreover, the access point receives data by setting usage duration, thereby preventing a single station from occupying the access point for a long time, and realizing fair allocation of resources of the access point. Moreover, problems of uplink access collisions, which occur in many systems incapable of supporting the PCF, may further be solved, and the application scenarios and scope are expanded.

Figure 4:
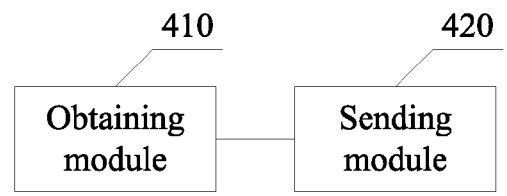
FIG. 4 is a schematic structural diagram of an access point provided in an embodiment of the present invention.

FIG. 4 is a schematic structural diagram of an access point provided in an embodiment of the present invention. Referring to FIG. 4, the access point includes an obtaining module 410 and a sending module 420.

The obtaining module 410 is configured to obtain an uplink access collision value, and send the obtained uplink access collision value to the sending module 420, where the uplink access collision is due to that multiple stations associated with the access point simultaneously send data to the access point. In a WLAN, when multiple stations simultaneously send data to an access point, an uplink access collision may occur. The obtaining module 410 may obtain the uplink access collision value according to maximum uplink throughput, a retransmission rate, the number of stations waiting to send data, idle usage, and the like.

The sending module 420 is configured to broadcast a first CTS signal to all the stations associated with the access point when determining that the uplink access collision value exceeds a preset threshold, so as to instruct a first station to send data to the access point. The first CTS signal includes a MAC address of the first station associated with the access point. The sending module 420 determines whether the uplink access collision value exceeds the preset threshold after receiving the uplink access collision value. When the sending module 420 determines that the uplink access collision value exceeds the preset threshold, it indicates that currently there is a large amount of data in the WLAN waiting for uplink transmission. To avoid entering a competitive mechanism, the sending module 420 broadcasts the first CTS signal, so as to instruct the first station to send data to the access point.

The preset threshold is a collision value preset and saved in the access point. Certainly, in practical application, the preset threshold is not constant, which may be adjusted according to a user requirement on uplink throughput of the WLAN. For example, if the user does not require high uplink throughput of the WLAN, that is, a large number of collisions are allowed to exist in the WLAN, the threshold may be set to a larger value; and if the user requires high uplink throughput of the WLAN, the threshold is set to a smaller value.

After the first CTS signal is broadcast, the stations associated with the access point may receive the first CTS signal, and each station may determine whether the MAC address in the first CTS signal is a MAC address of the station. When the first station determines that the MAC address of the station is consistent with the MAC address in the first CTS signal, the first station sends data to the access point if there is data to be sent at this moment. The other stations receiving the first CTS signal keep silent because the MAC addresses thereof are inconsistent with the MAC address in the first CTS signal. The access point receives the data sent by the first station, so as to complete uplink data access from the first station.

After the access point completes receiving the data from the first station, the obtaining module 410 continues to obtain an uplink access collision value, and sends the uplink access collision status to the sending module 420. When determining that the uplink access collision value still exceeds the preset threshold, the sending module 420 broadcasts a CTS signal carrying a MAC address of a station other than the first station, such as a second station, to all the associated stations.

In the embodiment of the present invention, an access point allocates resources by broadcasting a CTS signal, which enables stations to perform uplink access to the access point in an orderly manner, thereby avoiding occurrence of an uplink access collision.

Figure 5:
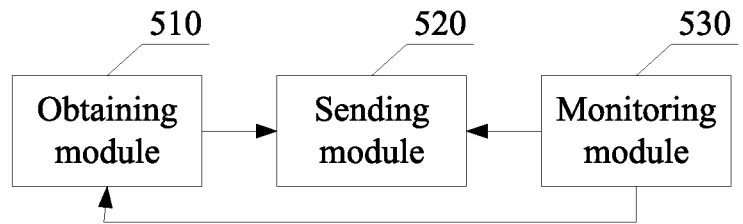
FIG. 5 is another schematic structural diagram of an access point provided in an embodiment of the present invention.

Preferably, FIG. 5 is another schematic structural diagram of an access point according to an embodiment of the present invention. Referring to FIG. 5, the access point includes an obtaining module 510, a sending module 520 and a monitoring module 530.

The obtaining module 510 is configured to obtain an uplink access collision value, and send the obtained uplink access collision value to the sending module 520, where the uplink access collision is due to that multiple stations associated with the access point simultaneously send data to the access point. In a WLAN, when multiple stations simultaneously send data to an access point, an uplink access collision may occur.

Specifically, the obtaining module 510 may obtain maximum uplink throughput, a retransmission rate, the current number of stations waiting to send data, and idle usage of the WLAN, obtain the uplink access collision value of the WLAN according to the foregoing obtained data and a preset algorithm, and then determine whether the uplink access collision value exceeds a preset threshold. According to the preset algorithm provided in this implementation manner, the maximum uplink throughput and the idle usage are inversely proportional to a collision condition, and the retransmission rate and the number of stations waiting to send data are directly proportional to the collision condition. That is, the smaller the maximum uplink throughput and the idle usage are, and the larger the retransmission rate and the number of stations waiting to send data are, the severer a collision in the WLAN is. Certainly, the present invention is not limited to obtaining the uplink access collision value according to the maximum uplink throughput, the retransmission rate, the current number of stations waiting to send data, the idle usage, and the like. In other implementation manners, the obtaining module 510 may further determine the threshold crossing by obtaining other data in the WLAN related to the collision, which is not limited herein.

The sending module 520 is configured to broadcast a first CTS signal to all the stations associated with the access point when determining that the uplink access collision value exceeds the preset threshold, so as to instruct a first station to send data to the access point. The first CTS signal includes a MAC address of the first station associated with the access point. The sending module 520 determines whether the uplink access collision value exceeds the preset threshold after receiving the uplink access collision value. Optionally, when determining that the uplink access collision value exceeds the preset threshold, the sending module 520 determines whether the access point supports a PCF, and when the access point does not support the PCF, broadcasts the first CTS signal to all the stations associated with the access point, so as to instruct the first station to send data to the access point. When the access point supports the PCF, the access point uses the PCF. In this case, the access point queries the stations associated with the access point according to a polling list, so as to enable the polled stations to send data to the access point, which avoids occurrence of a collision.

It should be noted that, it is optional for the sending module 520 to determine whether the access point supports a PCF. In other implementation manners, when determining that the uplink access collision value exceeds the preset threshold, the sending module 520 may not need to determine whether the PCF is supported, that is, no matter whether the access point supports the PCF, the access point broadcasts the first CTS signal to all the stations associated with the access point.

After the first CTS signal is broadcast, the stations associated with the access point may receive the first CTS signal, and each station may determine whether the MAC address in the first CTS signal is a MAC address of the station. When the first station determines that the MAC address of the station is consistent with the MAC address in the first CTS signal, the first station sends data to the access point if there is data to be sent at this moment. The other stations receiving the first CTS signal keep silent because the MAC addresses thereof are inconsistent with the MAC address in the first CTS signal. The access point receives the data sent by the first station, so as to complete uplink data access from the first station.

Optionally, the first CTS signal further includes usage duration, where the usage duration is used to instruct the first station to send data to the access point within the usage duration, so as to prevent the first station from occupying access resources of the access point for a long time probably due to a large amount of data to be sent and prevent other stations from waiting an excessively long time.

Further, optionally, when the first CTS signal includes usage duration, the access point receives within the usage duration the data sent by the first station; and if the first station still needs to send data when the usage duration is expired, the access point does not receive the data sent by the first station.

The monitoring module 530 is configured to monitor, within a preset waiting time, whether the access point receives the data sent by the first station. After the access point broadcasts the first CTS signal, the monitoring module 530 monitors, within the preset waiting time, whether the access point receives the data sent by the first station, and sends a monitoring result to the obtaining module 510 and the sending module 520.

The obtaining module 510 is further configured to obtain again an uplink access collision when the access point receives within the preset waiting time the data sent by the first station, so as to determine whether the current uplink access collision value exceeds the preset threshold.

The sending module 520 is further configured to broadcast a second CTS signal to all the stations associated with the access point if the access point does not receive within the preset waiting time the data sent by the first station, where the second CTS signal includes a MAC address of a second station associated with the access point, so as to instruct the second station to send data to the access point. Optionally, the second CTS signal further includes usage duration, so as to instruct the second station to send data to the access point within the usage duration. Further, optionally, when the second CTS signal includes usage duration, the access point receives within the usage duration the data sent by the second station; and if the second station still needs to send data when the usage duration is expired, the access point does not receive the data sent by the first station.

Optionally, considering that there is delay in data transmission, the preset waiting time in this implementation manner may be set to a time value larger than short interframe space SIFS, to prevent the monitoring module 530 from making a monitoring decision before a station sends data. The SIFS is interframe space for sending a frame to each other between the access point and a station during a general data transmission operation in the WLAN.

Further, optionally, the sending module 520 may further adjust transmit power of the access point and control size of coverage area, thereby controlling the number of the stations associated with and accessing the access point, so as to ensure network quality. For example, when the sending module 520 determines that an uplink access collision exists now, the transmit power of the access point may be lowered, and the coverage area of the access point may be narrowed down, so as to reduce the stations associated with and accessing the access point; in this way, uplink access data to the access point may also be reduced, which reduces collisions and improves uplink throughput.

In this implementation manner, an access point allocates resources by broadcasting a CTS signal, which enables stations to perform uplink access to the access point in an orderly manner, thereby avoiding occurrence of an uplink access collision. Moreover, the access point receives data by setting usage duration, thereby preventing a single station from occupying the access point for a long time, and realizing fair allocation of resources of the access point. Moreover, problems of uplink access collisions, which occur in many systems incapable of supporting the PCF, may further be solved, and the application scenarios and scope are expanded.

Figure 6:
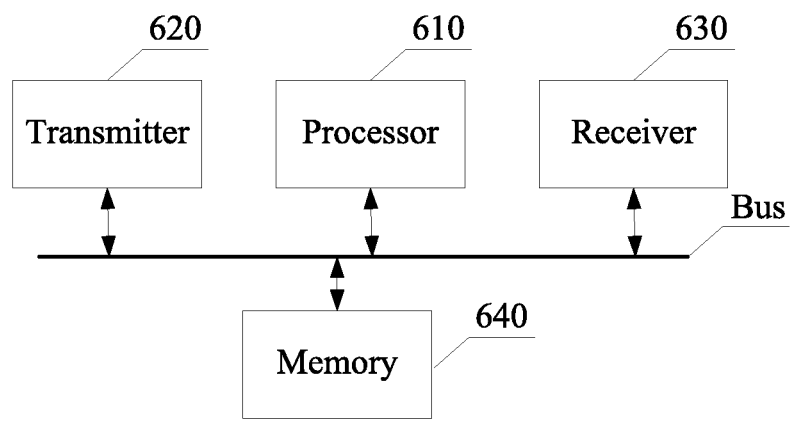
FIG. 6 is still another schematic structural diagram of an access point provided in an embodiment of the present invention.

FIG. 6 is still another schematic structural diagram of an access point according to an embodiment of the present invention. Referring to FIG. 6, the access point includes a processor 610, a transmitter 620, a receiver 630, and a memory 640. The processor 610, the transmitter 620, the receiver 630, and the memory 640 are connected by a bus (as shown in the figure).

The memory 640 is configured to store a program. Specifically, the program may include program code, where the program code includes a computer operation instruction. The memory 640 is further configured to store data used when the processor 610 works and data received by the processor 610.

The processor 610 executes the program stored in the memory 640, so as to obtain an uplink access collision value, determine whether the uplink access collision value exceeds a preset threshold, and send a thereby result to the transmitter 620. The uplink access collision is due to that multiple stations associated with the access point simultaneously send data to the access point. The preset threshold is a collision value preset and saved in the access point. In this implementation manner, the preset threshold is saved in the memory 640. Certainly, in practical application, the preset threshold is not constant, which may be adjusted according to a user requirement on uplink throughput of the WLAN.

Specifically, the processor 610 may obtain maximum uplink throughput, a retransmission rate, the current number of stations waiting to send data, and idle usage of the WLAN, obtain the uplink access collision value according to the foregoing obtained data and a preset algorithm, and then determine whether the collision value exceeds a preset threshold. The preset algorithm provided in this implementation manner may be stored in the memory 640, where the maximum uplink throughput and the idle usage are inversely proportional to the collision condition, and the retransmission rate and the number of stations waiting to send data are directly proportional to the collision condition. That is, the smaller the maximum uplink throughput and the idle usage are, and the larger the retransmission rate and the number of stations waiting to send data are, the severer a collision in the WLAN is. Certainly, the present invention is not limited to obtaining the uplink access collision value according to the maximum uplink throughput, the retransmission rate, the current number of stations waiting to send data, the idle usage, and the like. In other implementation manners, the processor 610 may further determine the threshold crossing by obtaining other data in the WLAN related to the collision, which is not limited herein.

The transmitter 620 is configured to broadcast a first CTS signal to all the stations associated with the access point when determining that the uplink access collision value exceeds the preset threshold, so as to instruct a first station to send data to the access point. The first CTS signal includes a MAC address of the first station associated with the access point.

After the first CTS signal is broadcast, the stations associated with the access point may receive the first CTS signal, and each station may determine whether the MAC address in the first CTS signal is a MAC address of the station. When the first station determines that the MAC address of the station is consistent with the MAC address in the first CTS signal, the first station sends data to the access point if there is data to be sent at this moment. The other stations receiving the first CTS signal keep silent because the MAC addresses thereof are inconsistent with the MAC address in the first CTS signal. The access point receives the data sent by the first station, so as to complete uplink data access from the first station.

Optionally, the first CTS signal further includes usage duration, where the usage duration is used to instruct the first station to send data to the access point within the usage duration, so as to prevent the first station from occupying access resources of the access point for a long time probably due to a large amount of data to be sent and prevent other stations from waiting an excessively long time.

The receiver 630 is configured to receive the data sent by the first station, and optionally, a receiver 630 receives within a receiving time the data sent by the first station. Further, optionally, when the first CTS signal includes usage duration, the receiver 630 receives within the usage duration the data sent by the first station; and if the first station still needs to send data when the usage duration is expired, the receiver 630 does not receive the data sent by the first station.

Optionally, the processor 610 may be further configured to determine whether the access point supports a PCF when determining that the uplink access collision value exceeds the preset threshold, and then send a thereby result to the transmitter 620. When the access point supports the PCF, the access point uses a PCF noncompetitive access mechanism, and queries the stations associated with the access point according to a polling list, so as to enable the polled stations to send data to the access point, which avoids occurrence of a collision.

The transmitter 620 may be further configured to broadcast the first CTS signal to all the stations associated with the access point, when the uplink access collision value exceeds the preset threshold and the access point does not support the PCF.

It should be noted that, it is optional for the transmitter 620 to determine whether the access point supports the PCF. In other implementation manners, when determining that the uplink access collision value exceeds the preset threshold, the transmitter 620 may not need to determine whether the PCF is supported, that is, no matter whether the access point supports the PCF, the access point broadcasts the first CTS signal to all the stations associated with the access point.

Further, the processor 610 is further configured to monitor, within a preset waiting time, whether the access point receives the data sent by the first station, and obtain again an uplink access collision value when monitoring, within the preset waiting time, that the access point receives the data sent by the first station, so as to determine whether the uplink access collision value exceeds the preset threshold; and send a monitoring result to the transmitter 620 when monitoring, within the preset waiting time, that the access point does not receive the data sent by the first station.

The transmitter 620 is further configured to broadcast a second CTS signal to all the stations associated with the access point when monitoring, within the preset waiting time, that the access point does not receive the data sent by the first station, where the second CTS signal includes a MAC address of a second station associated with the access point, so as to instruct the second station to send data to the access point. Optionally, the second CTS signal further includes usage duration, so as to instruct the second station to send data to the access point within the usage duration.

Optionally, considering that there is delay in data transmission, the preset waiting time in this implementation manner may be set to a time value larger than short interframe space SIFS, to prevent the processor 610 from making a monitoring decision before a station sends data. The SIFS is, in a data transmission operation in the WLAN, general interframe space for sending a frame to each other between the access point and a station.

Further, optionally, the processor 610 may further adjust transmit power of the access point and control size of coverage area, thereby controlling the number of the stations associated with and accessing the access point, so as to ensure network quality. For example, when the processor 610 determines that an uplink access collision exists now, the transmit power of the access point may be lowered, and the coverage area of the access point may be narrowed down, so as to reduce the stations associated with and accessing the access point; in this way, uplink access data to the access point may also be reduced, which reduces collisions and improves uplink throughput.

In this implementation manner, an access point allocates resources by broadcasting a CTS signal, which enables stations to perform uplink access to the access point in an orderly manner, thereby avoiding occurrence of an uplink access collision. Moreover, the access point receives data by setting usage duration, thereby preventing a single station from occupying the access point for a long time, and realizing fair allocation of resources of the access point. Moreover, problems of uplink access collisions, which occur in many systems incapable of supporting the PCF, may further be solved, and the application scenarios and scope are expanded.

An embodiment of the present invention further provides a WLAN system, and the system includes the access point in any embodiment of the present invention as shown in FIG. 4 to FIG. 6 and multiple stations, where the multiple stations are associated with the access point and access the access point. As shown in FIG. 1, the multiple stations at least include a first station and a second station.

The access point is configured to obtain an uplink access collision value, where the uplink access collision is due to that the multiple stations associated with the access point simultaneously send data to the access point; and broadcast a first CTS signal to the multiple stations when it is determined that the uplink access collision value exceeds a preset threshold, where the first CTS signal includes a MAC address of the first station associated with the access point, so as to instruct the first station to send data to the access point. For the structure and functions of the access point, reference may be specifically made to any embodiment as shown in FIG. 4 to FIG. 6, and the details are not described herein again.

The multiple stations are configured to receive the first CTS signal sent by the access point in a broadcast manner, and each station in the multiple stations determines whether a MAC address in the first CTS signal is a MAC address of the station.

Figure 7:
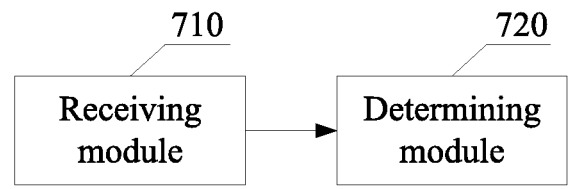
FIG. 7 is a schematic structural diagram of a station provided in an embodiment of the present invention.

FIG. 7 is a schematic structural diagram of a station provided in an embodiment of the present invention. Referring to FIG. 7, the station includes a receiving module 710 and a determining module 720.

The receiving module 710 is configured to receive a first CTS signal broadcast by an access point, and send the first CTS signal to the determining module 720. The access point in a WLAN where the station is located broadcasts the first CTS signal to all the stations associated with the access point when a collision value exceeds a preset threshold. The receiving module 710 receives the first CTS signal broadcast by the access point, where the first CTS signal includes a MAC address of the first station in the multiple stations associated with the access point.

The determining module 720 is configured to determine whether the MAC address in the first CTS signal is a MAC address of the station. The determining module 720 obtains the MAC address of the station, and determines whether the MAC address of the station is consistent with the MAC address in the first CTS signal sent by the receiving module 710. When the MAC address in the first CTS signal is the MAC address of the station, the station sends data to the access point, which enables stations to perform uplink access to the access point in an orderly manner, thereby avoiding occurrence of a collision. When the MAC address in the first CTS signal is not the MAC address of the station, the station keeps silent.

Optimally, the first CTS signal further includes usage duration, where the usage duration is used to instruct the station, whose MAC address is the MAC address in the first CTS signal, to send data to the access point within the usage duration, so as to prevent the station from occupying access resources of the access point for a long time probably due to a large amount of data to be sent and prevent other stations from waiting an excessively long time.

When the station determines that the MAC address in the first CTS signal is the MAC address of the station and there is data to be sent, the station sends the data to the access point within the usage duration. The station sends the data to the access point in the WLAN where the station is located according to the usage duration in the first CTS signal. When the sending time is equal to the usage duration, the station stops sending the data; the station does not continue the sending process until the station again receives a CTS signal indicating that the access point allows the station to send data.

In this implementation manner, a station determines, according to a MAC address in a CTS signal sent by an access point, whether to send data to the access point, and no additional protocol such as a PCF needs to be supported. Therefore, the application scenarios and scope are expanded.

According to the foregoing solutions of this application, when it is determined that an uplink access collision value exceeds a preset threshold, an access point automatically and cyclically broadcasts a CTS signal, so as to prompt the station identified by a MAC address in the CTS signal to send data to the access point, which enables stations to perform uplink access to the access point in an orderly manner, thereby avoiding occurrence of an uplink access collision; when an uplink access collision may occur in a WLAN, an access competitive mechanism can be avoided, so as to prevent the uplink access collision from occurring in the WLAN, improve an uplink data sending rate, and increase uplink throughput of the WLAN. Moreover, problems of uplink access collisions, which occur in many systems incapable of supporting a PCF, may further be solved. In addition, a station in this application determines, according to a MAC address in a CTS signal sent by an access point, whether to send data to the access point, and does not need to support an additional protocol, so that the application scenarios and scope are expanded.

In the several embodiments provided in the present application, it should be understood that the disclosed system, apparatuses, and methods may be implemented in other manners. For example, the described apparatus embodiments are merely exemplary. For example, the division of modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable memory medium. Based on such an understanding, the technical solutions of the present application essentially, or the part contributing to the prior art, or all or a part of the technical solutions may be implemented in a form of a software product. The computer software product is stored in a memory medium and includes several instructions for instructing a computer device (which may be a personal computer, a server, a network device, or the like) or a processor to perform all or a part of the steps of the methods described in the embodiments of the present application. The foregoing memory medium includes: any medium that can store program code, such as a USB flash drive, a removable hard disk, a read-only memory (ROM), a random-access memory (RAM), a magnetic disk, or an optical disc.

What is claimed is:

1. A method for accessing a wireless local area network, the method comprising:
   obtaining, by an access point, an uplink access collision value, wherein an uplink access collision is caused by multiple stations associated with the access point simultaneously sending data to the access point; and sending, by the access point, a first clear to send signal to all the stations associated with the access point when it is determined that the uplink access collision value exceeds a preset threshold, wherein a receiver address of the first clear to send signal is a media access control address of a first station associated with the access point, so as to instruct the first station to send data to the access point, and the first clear to send signal is not responsive to any signal;

monitoring, within a preset waiting time, whether the access point receives the data sent by the first station;

obtaining another uplink access collision value if the access point receives within the preset waiting time the data sent by the first station; and sending a second clear to send signal to all the stations associated with the access point if the access point does not receive within the preset waiting time the data sent by the first station, wherein a receiver address of the second clear to send signal is a media access control address of a second station associated with the access point, so as to instruct the second station to send data to the access point, and the second clear to send signal is not responsive to any signal.

2. The method according to claim 1, wherein the first clear to send signal further comprises usage duration, so as to instruct the first station to send data to the access point within the usage duration.

3. The method according to claim 1, wherein obtaining the uplink access collision value comprises obtaining the uplink access collision value according to maximum uplink throughput, a retransmission rate, a number of stations waiting to send data, and idle usage.

4. The method according to claim 2, wherein obtaining the uplink access collision value comprises obtaining the uplink access collision value according to maximum uplink throughput, a retransmission rate, a number of stations waiting to send data, and idle usage.

5. The method according to claim 1, further comprising:
monitoring, within a preset waiting time, whether the access point receives the data sent by the first station;
obtaining another uplink access collision value if the access point receives within the preset waiting time the data sent by the first station; and
sending a second clear to send signal to all the stations associated with the access point if the access point does not receive within the preset waiting time the data sent by the first station, wherein a receiver address of the second clear to send signal is a media access control address of a second station associated with the access point, so as to instruct the second station to send data to the access point, and the second clear to send signal is not responsive to any signal.

6. The method according to claim 2, further comprising:
monitoring, within a preset waiting time, whether the access point receives the data sent by the first station;
obtaining another uplink access collision value if the access point receives within the preset waiting time the data sent by the first station; and
sending a second clear to send signal to all the stations associated with the access point if the access point does not receive within the preset waiting time the data sent by the first station, wherein a receiver address of the second clear to send signal is a media access control address of a second station associated with the access point, so as to instruct the second station to send data to the access point, and the second clear to send signal is not responsive to any signal.

7. The method according to claim 1, wherein before sending the first clear to send signal to all the stations associated with the access point, the method further comprises determining that the access point does not support a point coordination function.

8. An access point, comprising:
an obtaining module, configured to obtain an uplink access collision value, wherein an uplink access collision is due to multiple stations associated with the access point simultaneously sending data to the access point; and
a sending module, configured to send a first clear to send signal to all the stations associated with the access point when it is determined that the uplink access collision value exceeds a preset threshold, wherein a receiver address of the first clear to send signal is a media access control address of a first station associated with the access point, so as to instruct the first station to send data to the access point, and the first clear to send signal is not responsive to any signal;
a monitoring module, which is configured to monitor, within a preset waiting time, whether the access point receives the data sent by the first station;
wherein the obtaining module is further configured to obtain again an uplink access collision value when the access point receives within the preset waiting time the data sent by the first station; and
wherein the sending module is further configured to send a second clear to send signal to all the stations associated with the access point when the access point does not receive within the preset waiting time the data sent by the first station, wherein a receiver address of the second clear to send signal is a media access control address of a second station associated with the access point, so as to instruct the second station to send data to the access point, and the second clear to send signal is not responsive to any signal.

9. The access point according to claim 8, wherein the first clear to send signal further comprises usage duration, so as to instruct the first station to send data to the access point within the usage duration.

10. The access point according to claim 8, wherein the obtaining module is configured to obtain the uplink access collision value according to maximum uplink throughput, a retransmission rate, a number of stations waiting to send data, and idle usage.

11. The access point according to claim 9, wherein the obtaining module is specifically configured to obtain the uplink access collision value according to maximum uplink throughput, a retransmission rate, a number of stations waiting to send data, and idle usage.

12. The access point according to claim 8, further comprising a monitoring module, which is configured to monitor, within a preset waiting time, whether the access point receives the data sent by the first station;
wherein the obtaining module is further configured to obtain again an uplink access collision value when the access point receives within the preset waiting time the data sent by the first station; and
wherein the sending module is further configured to send a second clear to send signal to all the stations associated with the access point when the access point does not receive within the preset waiting time the data sent by the first station, wherein a receiver address of the second clear to send signal is a media access control address of a second station associated with the access point, so as to instruct the second station to send data to the access point, and the second clear to send signal is not responsive to any signal.

13. The access point according to claim 9, further comprising a monitoring module, which is configured to monitor, within a preset waiting time, whether the access point receives the data sent by the first station;
wherein the obtaining module is further configured to obtain again an uplink access collision value when the access point receives within the preset waiting time the data sent by the first station; and
wherein the sending module is further configured to send a second clear to send signal to all the stations associated with the access point when the access point does not receive within the preset waiting time the data sent by the first station, wherein a receiver address of the second clear to send signal is a media access control address of a second station associated with the access point, so as to instruct the second station to send data to the access point, and the second clear to send signal is not responsive to any signal.

14. A wireless local area network system, comprising:
an access point; and
a plurality of stations associated with the access point;
wherein the access point is configured to obtain an uplink access collision value, wherein an uplink access collision is due to the stations simultaneously sending data to the access point, wherein the access point is further configured to send a first clear to send signal to the stations when it is determined that the uplink access collision value exceeds a preset threshold, wherein a receiver address of the first clear to send signal is a media access control address of a first station associated with the access point, so as to instruct the first station to send data to the access point, and the first clear to send signal is not responsive to any signal, wherein the access point is further configured to monitor, within a preset waiting time, whether the access point receives the data sent by the first station, obtain another uplink access collision value if the access point receives within the preset waiting time the data sent by the first station, and send a second clear to send signal to all the stations associated with the access point if the access point does not receive within the preset waiting time the data sent by the first station, wherein a receiver address of the second clear to send signal is a media access control address of a second station associated with the access point, so as to instruct the second station to send data to the access point, and the second clear to send signal is not responsive to any signal; and
wherein the stations are configured to receive the first clear to send signal sent by the access point, and wherein each station in the plurality of stations is configured to determine whether the receiver address of the first clear to send signal is a media access control address of the station.

* * * * *